Figure 1:
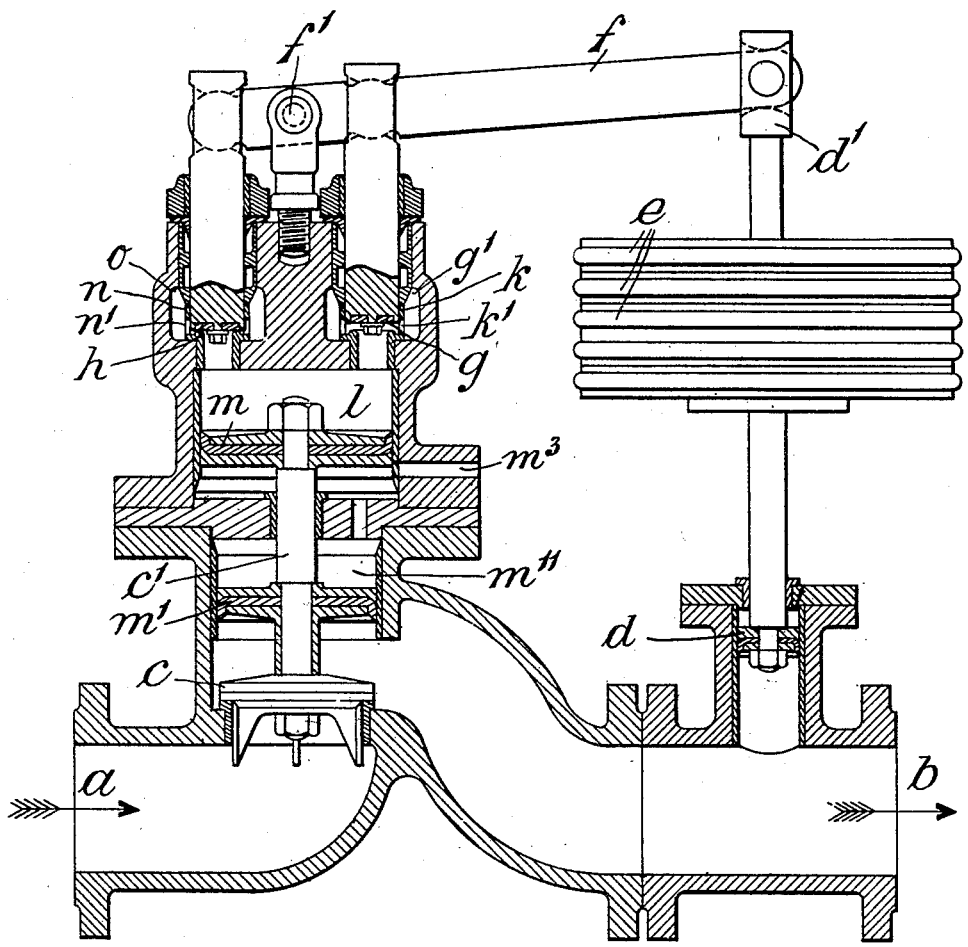

No. 863,900. PATENTED AUG. 20, 1907.
J. B. BROADHEAD.
APPARATUS FOR REGULATING PRESSURE IN PIPES.
APPLICATION FILED APR. 22, 1907.

5 SHEETS—SHEET 1.

Witnesses.
Walter Allen
L. B. Middleton

Inventor.
John B. Broadhead
by Herbert W. Jenner.
Attorney.

No. 863,900. PATENTED AUG. 20, 1907.
J. B. BROADHEAD.
APPARATUS FOR REGULATING PRESSURE IN PIPES.
APPLICATION FILED APR. 22, 1907.

5 SHEETS—SHEET 2.

Witnesses.
Walter Allen
L. B. Middleton

Inventor.
John B. Broadhead
by Herbert W. Jenner
Attorney.

No. 863,900. PATENTED AUG. 20, 1907.
J. B. BROADHEAD.
APPARATUS FOR REGULATING PRESSURE IN PIPES.
APPLICATION FILED APR. 22, 1907.

5 SHEETS—SHEET 3.

Witnesses.
Walter Allen
L. B. Middleton

Inventor.
John B. Broadhead
by Herbert W. Jenner,
Attorney.

No. 863,900. PATENTED AUG. 20, 1907.
J. B. BROADHEAD.
APPARATUS FOR REGULATING PRESSURE IN PIPES.
APPLICATION FILED APR. 22, 1907.

5 SHEETS—SHEET 5.

Witnesses.
Walter Allen
S. B. Middleton

Inventor.
John B. Broadhead,
by Herbert W. Jenner
Attorney.

UNITED STATES PATENT OFFICE.

JOHN B. BROADHEAD, OF WELLHOLME, BRIGHOUSE, ENGLAND.

APPARATUS FOR REGULATING PRESSURE IN PIPES.

No. 863,900.   Specification of Letters Patent.   Patented Aug. 20, 1907.

Application filed April 22, 1907. Serial No. 369,570.

*To all whom it may concern:*

Be it known that I, JOHN BEARDSELL BROADHEAD, a subject of the King of Great Britain, residing at Wellholme, Brighouse, in the county of York, England, engineer, have invented an Improved Apparatus for Regulating Pressure in Pipes, of which the following is a specification.

My invention relates to that class of apparatus, for regulating pressure in pipes, in which the movement of a valve controlling the pressure supply is itself controlled by the delivery pressure of the fluid, acting upon a piston against the action of weights or springs.

The main object of my invention is to provide an improved arrangement of inlet and outlet valves actuated by a lever and weighted piston, for regulating the admission and expulsion of high pressure fluid to and from the upper side of a piston connected to a main valve controlling the pressure supply, or to the upper side of a piston connected to another piston and main valve controlling such supply.

Another object of my invention is to construct an apparatus of this type in such a manner that if required, as in the event of fire, the main valve may be easily fixed in a fully opened position and thus render the full pressure available in the low pressure main.

The apparatus is more particularly applicable to water mains in towns or districts where the pressure in mains or pipes may vary considerably owing to differences in altitude. The pressure may, in such cases, be all right for a higher level, but will, by gravitation, become too great for a lower level and thereby render the main liable to fracture. The apparatus is, however, also applicable for the purpose of controlling and regulating the pressure of steam or any liquid or fluid.

In describing my invention I will make reference to the accompanying drawings illustrative thereof, in which—

Figure 2:
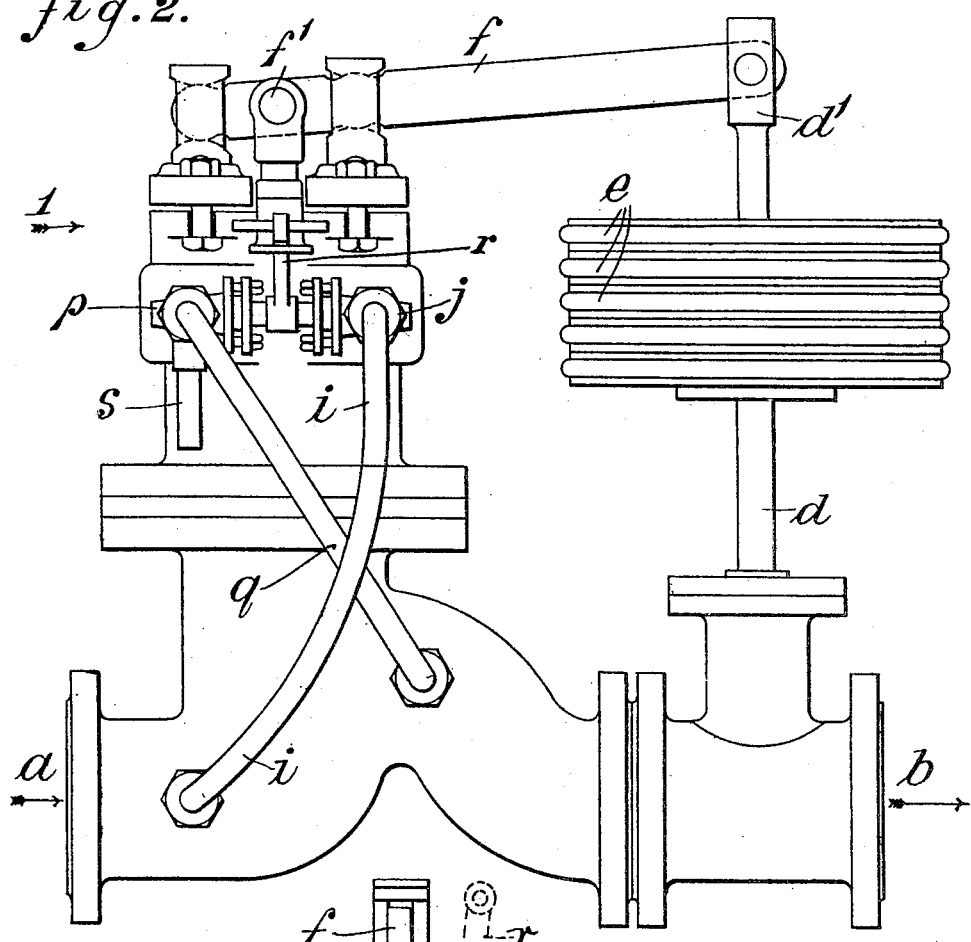
Figure 3:
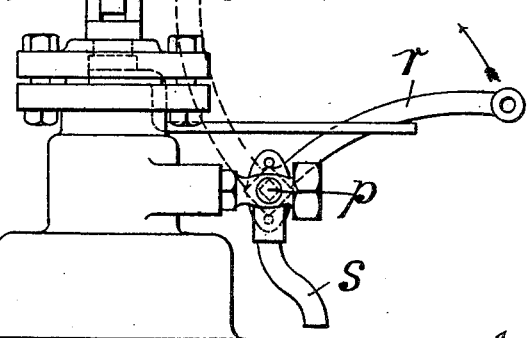
Figure 4:
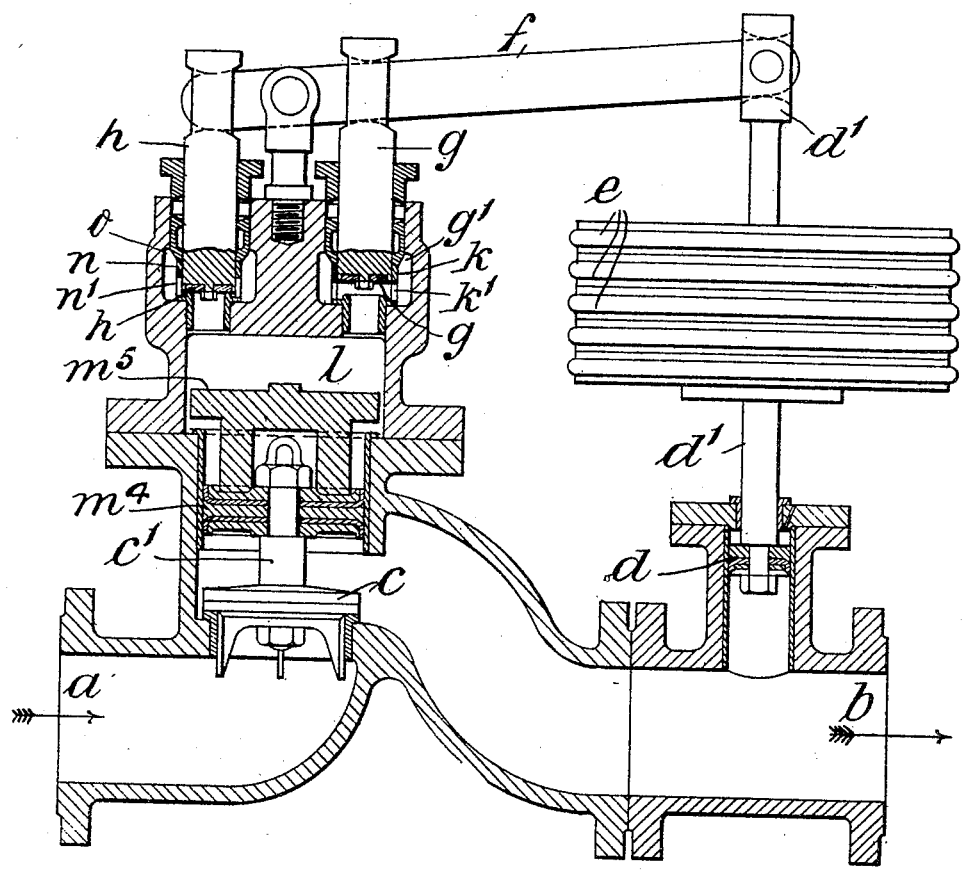
Figure 5:
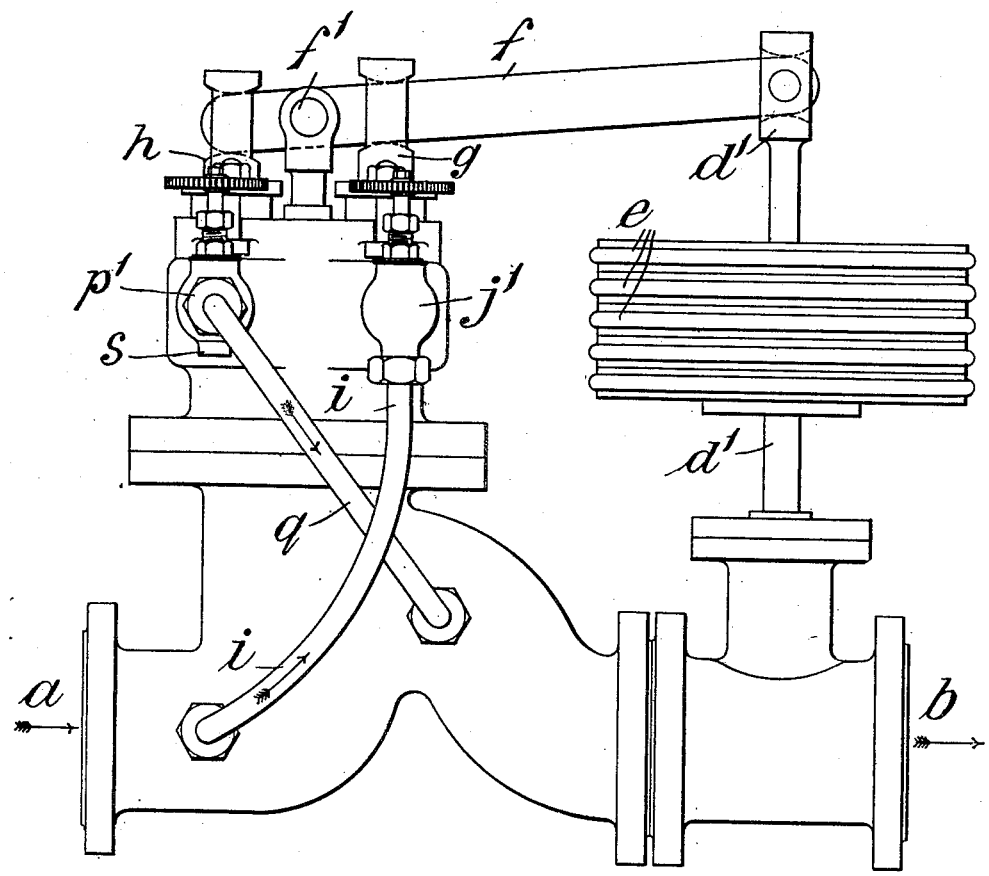
Figure 6:
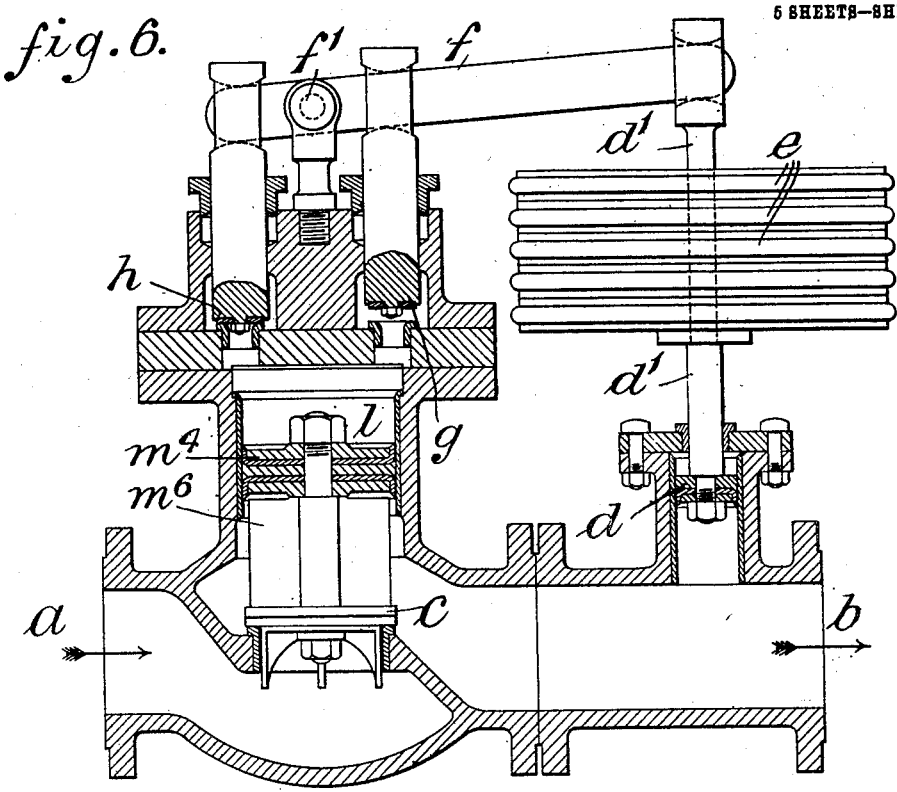
Figure 7:
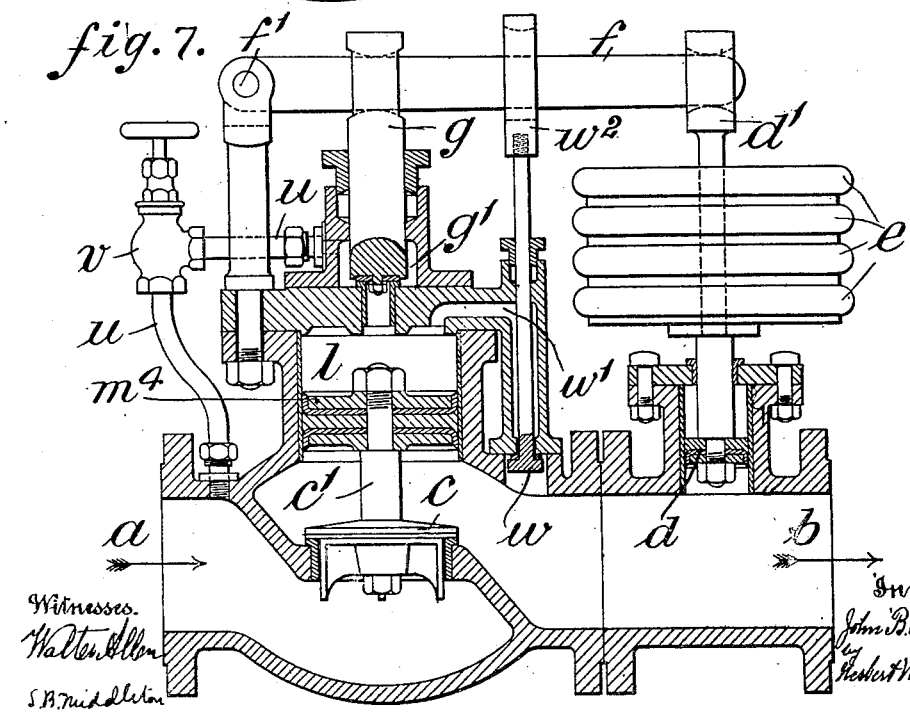

Figure 1 is a vertical section, on a plane passing through the centers of the valves, of a pressure regulator embodying my improvements; Fig. 2 is a side elevation of the regulator shown in Fig. 1; Fig. 3 is an end elevation of the regulating valve chamber looking in the direction of the arrow 1, Fig. 2; Fig. 4 is a vertical section, similar to Fig. 1, of an embodiment of my invention in which a single piston only, connected to the main valve controlling the pressure supply, is employed; Fig. 5 is a side elevation of the form of apparatus shown in Fig. 4; Figs. 6 and 7 are modified forms of apparatus which will be hereinafter referred to.

Similar letters of reference indicate corresponding parts in the several views.

Referring firstly to the embodiment of the invention shown in Figs. 1 and 2, letter $a$ indicates the inlet to the regulator which is, of course, connected to the high pressure main or pipe. $b$ represents the outlet, which is connected to the reduced pressure main or pipe. When first charging the reduced pressure main, the high pressure liquid or fluid acts on the inlet side of the valve $c$ and flow takes place past it until a pre-determined pressure has been reached in the reduced pressure main. The piston $d$, the underside of which is open to the reduced pressure, is loaded with weights $e$, or instead of weights I may employ springs, to determine the point to which the pressure is to be reduced, and these weights or springs may be varied as desired. When the desired pressure on the outlet side is attained, the piston $d$ is moved upwards thereby (into the position shown on the drawings) and a projection $d'$ from the piston rod raises the end of a lever $f$, pivoted thereto, and to the regulator casing at $f'$. This movement of the lever $f$ causes the regulator valves $g$ and $h$, with which the said lever engages, to be respectively opened and closed. The opening of the regulating valve permits the high pressure liquid or fluid to flow through the pipe $i$ and cock $j$ into the chamber $g'$, and thence through the ports $k'$ in the liner $k$ into the chamber $l$ where it acts on the upper side of the piston $m$ connected by the spindle $c'$ to the piston $m'$ and the main valve $c$. The cock $j$ is always open except in case of fire, as will be hereafter explained. The area of the piston $m$ being larger than the area of the piston $m'$ or valve $c$, the pressure acting on the upper side of the said piston $m$ closes the valve $c$ and cuts off the pressure supply. The valve $c$ remains closed until such time as the pressure on the outlet side of the regulator is reduced by a draw on the reduced pressure main. When the pressure on the outlet side falls below the point desired, the weights or springs $e$ overcome the pressure on the underside of the piston $d$, which consequently falls and carries with it the end of the lever $f$, thus closing the regulating valve $g$. The reduced pressure main being charged, the valve $c$ is acted upon at both sides, but by different pressures. The pressure on the inlet side of the valve $c$ combined with the reduced pressure acting on the underside of the piston $m'$ opens the valve $c$ and causes the piston $m$ to displace the water in the chamber $l$ through the ports $n'$ in the liner $n$ into the chamber $o$ whence it passes through the two way cock $p$ and pipe $q$ to the reduced pressure side of the regulator, the cock $p$ being always open to the reduced pressure side except in case of fire.

In case of fire the cocks $j$ and $p$ are both closed, this being conveniently effected by means of the lever $r$ connected to both, movement of which through one quarter turn, that is to say, from the position shown in full line in Fig. 3 to that shown in dotted line, simultaneously closing the cocks. The closing of the cock $j$ cuts off the supply of high pressure liquid or fluid from the upper side of the piston $m$. The cock $p$ being of a two way type cuts off, on being closed, the pressure from the outlet side of the regulator to the top of the said piston $m$, and opens a port $s$ to the atmosphere to permit of escape of water from the chamber $l$, thus allowing the main valve $c$ to remain fully open and rendering the full pressure available for fire. The space $m''$ between the pistons $m$ and $m'$ receives any water which may escape past either of the said pistons, the drainage water emptying through a drainage aperture $m^3$, and giving an indication of the leakage.

In the embodiment in Figs. 4 and 5. only one piston $m^4$ is employed, the reduced pressure acting on its underside, and the high pressure on its upper side. To assist in closing the valve $c$ the piston $m^4$ is loaded with a weight $m^5$. Also, in place of the cock $j$ and two way cock $p$, a valve $j'$ and a two way valve $p'$ are employed. In case of fire these valves are both closed separately instead of simultaneously, as are the cocks in the previously described arrangement.

Fig. 6 shows another embodiment in which one piston only is employed, but in this case a weight $m^6$ placed between the piston and the valve is employed instead of a weight resting on the piston as in Fig. 4.

In Fig. 7 a somewhat modified form of apparatus is shown. In this arrangement only one piston $m^4$ is employed and the regulating valve $g$ controlling admission of high pressure fluid to the top of the piston is placed centrally above it. A pipe $u$ affords a passage for the high pressure fluid to the chamber surrounding the valve $g$ and a valve $v$ located in the said pipe enables the pressure supply to be cut off in case of fire. In this instance, the regulating valve controlling the expulsion of the liquid or fluid from the chamber on the upper side of the piston $m^4$ is shown at $w$, this valve controlling a passage $w'$ leading from the chamber to the outlet or reduced pressure side of the main valve $c$. A connection $w^2$ from the valve $w$ rides on the lever $f$, the motion of which controls the movement of the valves as will be well understood.

I wish it to be understood that I do not limit myself to the precise details of construction and arrangement herein shown, as these may be varied in many ways without departing from the spirit of my invention.

I claim.

1. The combination, with a regulator casing provided with an inlet for high-pressure liquid and an outlet, of a main valve for closing the said inlet, a main cylinder, a main piston slidable in the said main cylinder and operatively connected with the said main valve, pipes or passages connecting the said main cylinder with the said inlet and outlet respectively, auxiliary valves controlling the said pipes or passages, an auxiliary cylinder connected to the said outlet, an auxiliary piston slidable in the said auxiliary cylinder, and lever mechanism operatively connected with the said auxiliary piston and auxiliary valves and operating to place the said main cylinder in communication with the said inlet and out of communication with the said outlet when the pressure in the said outlet exceeds a prearranged limit, thereby causing the said main piston to close the said main valve.

2. The combination, with a regulator casing provided with an inlet for high-pressure liquid and an outlet, of a main valve for closing the said inlet, a main cylinder, a main piston slidable in the said main cylinder and operatively connected with the said main valve, pipes or passages connecting the said main cylinder with the said inlet and outlet respectively, auxiliary valves controlling the said pipes or passages, means for controlling the flow of liquid through the said pipes or passages independent of the said auxiliary valves and for use in case of emergency, an auxiliary cylinder connected to the said outlet, an auxiliary piston slidable in the said auxiliary cylinder, and lever mechanism operatively connected with the said auxiliary piston and auxiliary valves and operating to place the said main cylinder in communication with the said inlet and out of communication with the said outlet when the pressure in the said outlet exceeds a prearranged limit, thereby causing the said main piston to close the said main valve.

3. The combination, with a regulator casing provided with an inlet for high-pressure liquid and an outlet, of a main valve for closing the said inlet, a main cylinder, a main piston slidable in the said main cylinder and operatively connected with the said main valve, pipes or passages connecting the said main cylinder with the said inlet and outlet respectively, auxiliary valves controlling the said pipes or passages, a second cylinder of smaller area than the said main cylinder and arranged between it and the said outlet, a second piston slidable in the said second cylinder and operatively connected with the said main piston and main valve, the adjacent ends of the two said cylinders being in communication with each other, an auxiliary cylinder connected to the said outlet, an auxiliary piston slidable in the said auxiliary cylinder, and lever mechanism operatively connected with the said auxiliary piston and auxiliary valves and operating to place the said main cylinder in communication with the said inlet and out of communication with the said outlet when the pressure in the said outlet exceeds a prearranged limit, thereby causing the said main piston to close the said main valve.

In witness whereof I have hereunto set my hand in presence of two witnesses.

JOHN B. BROADHEAD.

Witnesses:
THOMAS H. BARRON,
ELSIE GLEDHILL.